June 28, 1966 S. D. WEISMAN ETAL 3,257,905
FIREARM ACTIVATED GENERATOR
Filed April 15, 1964 3 Sheets-Sheet 1

INVENTORS
SORRELL D. WEISMAN
GARY DRUCKER
BY
OSTROLENK, FABER, GERB & SOFFEN
ATTORNEYS

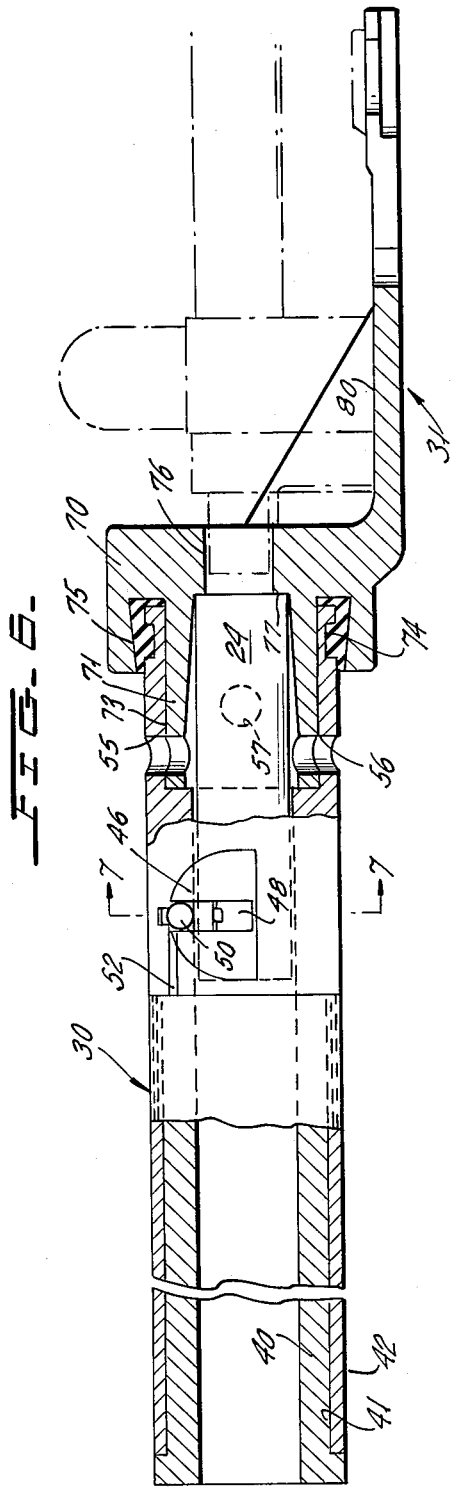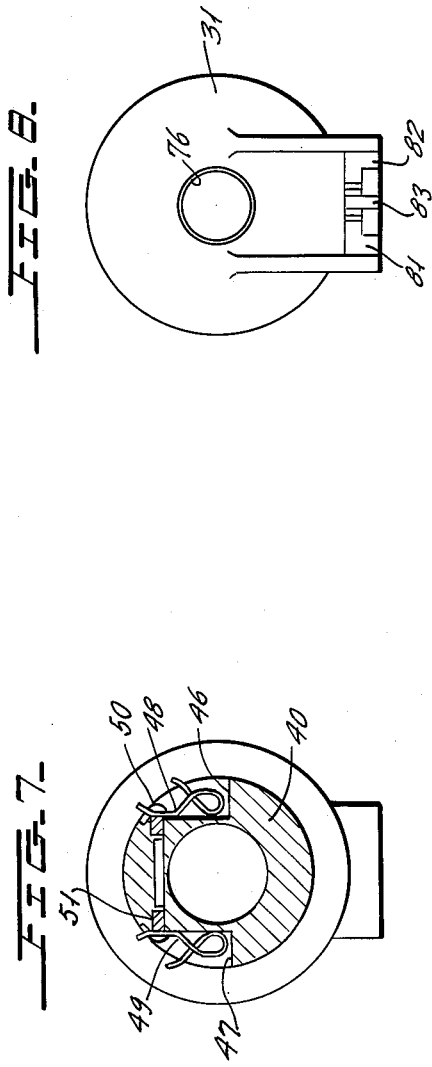

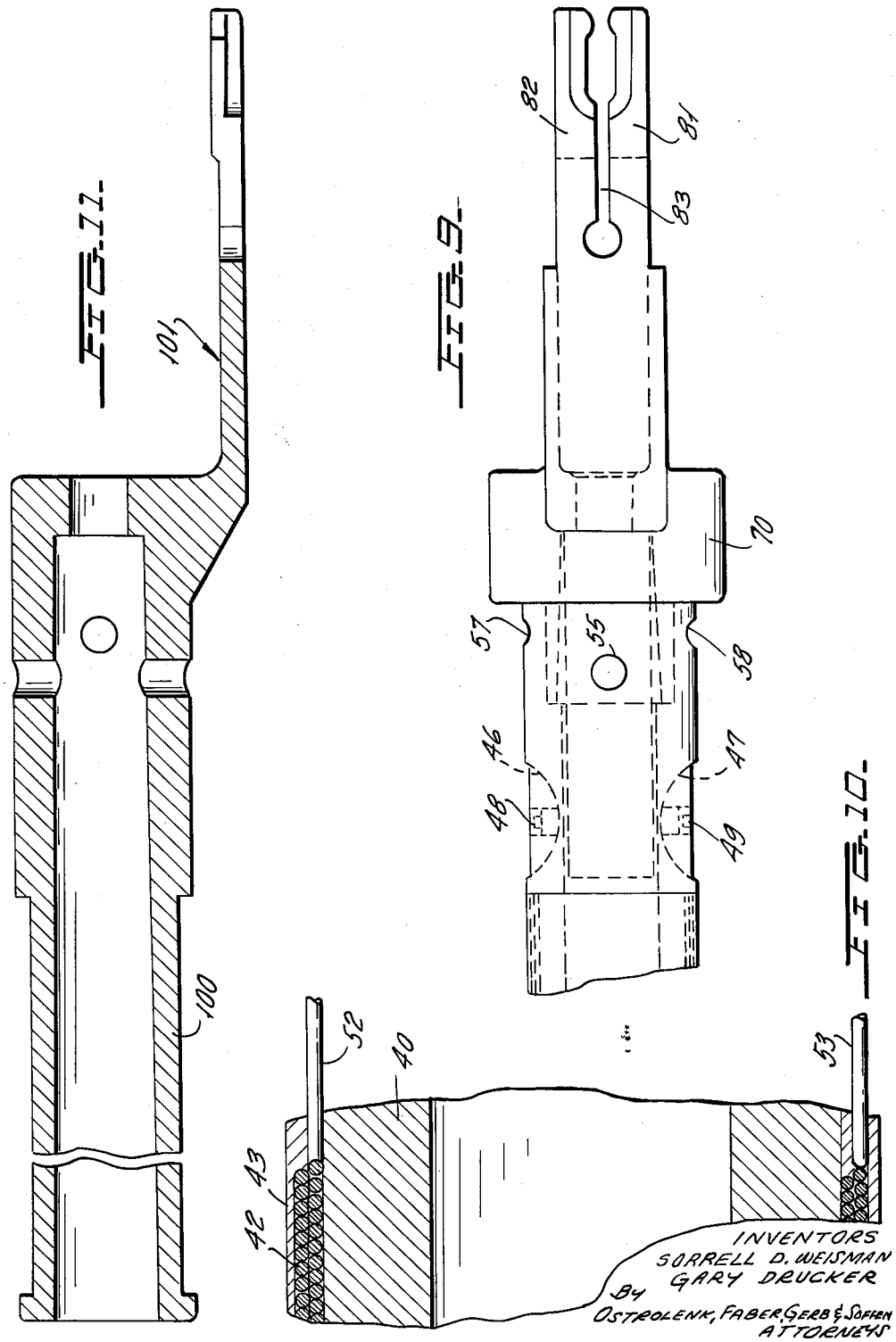

United States Patent Office 3,257,905
Patented June 28, 1966

3,257,905
FIREARM ACTIVATED GENERATOR
Sorrell D. Weisman, Valley Stream, and Gary Drucker, Yonkers, N.Y., assignors to Kollsman Instrument Corporation, Elmhurst, N.Y., a corporation of New York
Filed Apr. 15, 1964, Ser. No. 360,049
3 Claims. (Cl. 89—1)

This invention relates to an electrical generator, and more particularly relates to a novel apparatus which is connectable to a firearm, whereby a magnetic body is propelled through an electrical coil by the firearm, thereby to generate an electrical voltage in the winding which may be used for the detonation of blasting caps, or the like.

There are many applications which require a simple and lightweight field generator which will generate sufficient power for the detonation of one or more blasting caps. By way of example, field troops in combat areas frequently require an electrical generator for the detonation of blasting caps. In the past, this purpose has been served through the usual type of plunger-actuated generator which is relatively heavy and bulky. Other attempts for the production of simple and lightweight field generators have included spring-wound pancake-type generators which will accelerate an armature to generate sufficient current to actuate parallel connected blasting caps. While this device is relatively light, it has a large number of parts, is relatively expensive, and is not highly reliable.

The principle of the present invention is to provide a novel and extremely reliable field generator, which is easily carried by troops by virtue of its light weight and small bulk.

More particularly, the present invention provides a novel structure having an elongated coil therein which can be easily connected to a firearm such as a rifle. The coil is concentric with the barrel of the firearm, whereby the firing of a permanent magnet body through the coil will cause an induced voltage in the coil which can be used for the detonation of remotely located blasting caps, or the like.

The magnet body or magnetic actuator can be comprised of a separate permanent magnetic body carried within the adaptor structure. The firing of a blank or a crimped cartridge in the firearm will then provide the force for moving the magnet through the coil and out of the adaptor to cause the generation of a voltage. Clearly, however, a special cartridge could be provided which has a permanent magnet bullet which, when fired through the coil, will generate the required voltage.

Note that the adaptor structure can be repeatedly used, it being necessary only to provide a number of magnetic actuators for the personnel using the equipment.

Accordingly, a primary object of this invention is to provide a novel field generator which is highly reliable.

Another object of this invention is to provide a novel generator for troops or personnel in remote areas which is light in weight and small in bulk.

Another object of this invention is to provide a novel, simple field generator which is inexpensive.

A still further object of this invention is to provide a novel, simple lightweight field generator which has a minimum of components.

Yet another object of this invention is to provide a novel portable generator which is easily affixed to a firearm which provides the operating power for the generator.

These and other objects of this invention will become apparent from the following description when taken in connection with the drawings, in which:

FIGURE 6 is a side cross-sectional view of the generator of FIGURES 2 and 3.

FIGURE 7 is a cross-sectional view of FIGURE 6 taken across the lines 7—7 in FIGURE 6.

FIGURE 8 is a rear view of the assembly of FIGURE 7.

FIGURE 9 is a bottom plan view of the righthand portion of the assembly of FIGURE 7.

FIGURE 10 is an enlarged detail cross-sectional view of a portion of the tube of FIGURE 6 to illustrate the manner in which the winding is formed on the tube.

FIGURE 11 shows a side cross-sectional view of the second embodiment of the invention to illustrate the manner in which the mounting body can be formed of a single member.

Figure 1:
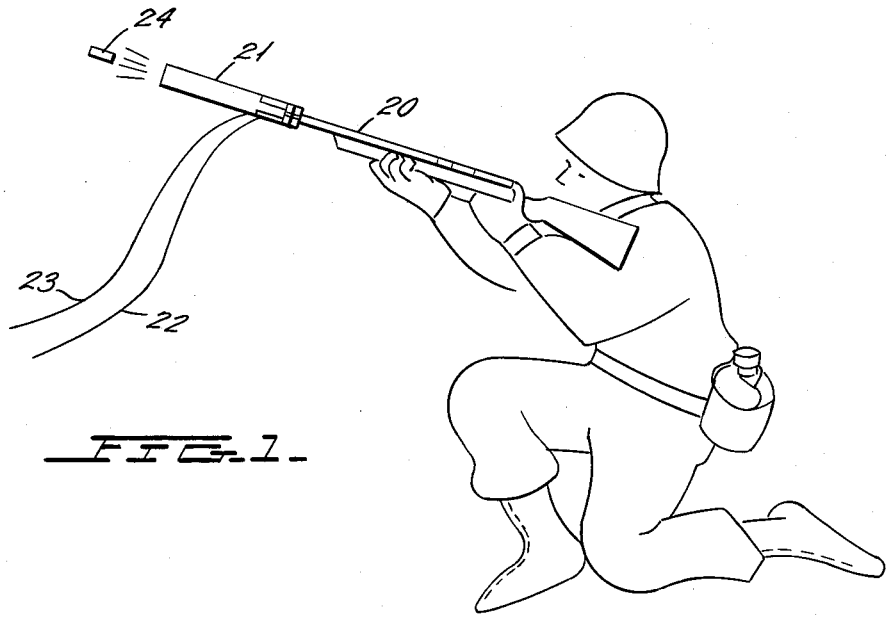
FIGURE 1 illustrates a soldier using a firearm adapted with the novel field generator of the invention.

Referring first to FIGURE 1, we have illustrated therein a soldier having a firearm 20 which could, for example, be an M-1 type rifle which has the novel field generator 21 removably connected to the end thereof. A pair of terminal wires 22 and 23 are connected to a coil within the assembly 21 and through which a magnetic actuator, or permanent magnet body 24 passes (FIGURES 4 and 5), responsive to the firing of a blank cartridge in the firearm 20.

The adaptor structure 21 which will be described in detail hereinafter will have a total weight of the order of 14 ounces, and has a single moving part comprised of the magnetic actuator 24. It was found that ten blasting caps of the standard Jz type army issue connected in parallel with one another and in series with the ends of leads 22 and 23 were fired when these leads had a length of the order of 200 feet. In this test, the output voltage applied to leads 22 and 23 was 56 volts, and the output current required for firing the ten parallel connected caps was 30 amperes. The velocity of the magnetic actuator 24 passing through the coil in assembly 21 was 180 feet per second, the magnetic actuator was of Alnico V 5–7 material, 3 inches long, and ¾ inch in diameter, having a mass of 0.3 pound, and a field strength of 10,500 gauss. Note that a length to diameter ratio of 4 to 1 is very desirable for the actuator.

Figure 2:
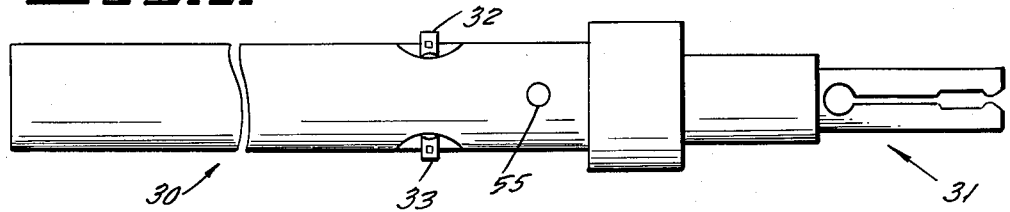
FIGURE 2 is a plan view of the novel adaptor of the invention.
Figure 3:
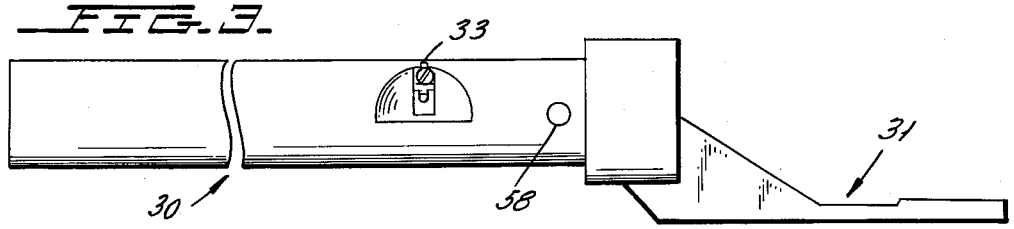
FIGURE 3 is a side view of FIGURE 2.

The assembly 21 of FIGURE 1 is shown in plan view in FIGURES 2 and 3, and is seen to be comprised of a barrel section 30 and a quick connect-disconnect section 31. A pair of terminals 32 and 33 are then available for receiving connection to leads such as leads 22 and 23 of FIGURE 1.

The connect-disconnect structure 31 is so designed as to snap over the bayonet projection on the rifle muzzle. This attachment is sufficient to withstand the effects of the actual propelling action but allows for the entire assembly to be pulled off with its wire attachment.

The details of the construction of the novel generator are best seen in FIGURES 6 through 10.

Referring first to FIGURE 6, the tube-wound core structure 30 is comprised of a non-metallic tubular body portion 40 which may be of glass-cloth reinforced epoxy, and has an elongated annular notch 41 in the body thereof. A two-layer winding 42 of No. 20 magnet wire is then wound in two layers to form approximately 320 turns contained within the groove 41, this winding thereafter being coated with a suitable epoxy resin surface 43 to reinstate its original diameter (FIGURE 10).

Two notches 46 and 47 are then formed in tube 40 (FIGURES 6, 7 and 9) and a pair of terminal clips 48 and 49 are secured in notches 46 and 47, respectively, by means of self-tapping screws 50 and 51, respectively, each coated in epoxy resin. The lead wires 52 and 53 of coil 42 (FIGURE 10) are then soldered to respective clips 48 and 49, as shown, for example, by lead 52 in FIGURE 6, which is connected to clip 48. Note that clips 48 and 49 of FIGURES 6, 7 and 9 correspond to clips 32 and 33 of FIGURES 2 and 3.

Suitable exhaust openings such as opposed openings 55 and 56 (FIGURES 2 and 6) are then formed toward the base of the tube 40 and serve as exhaust ports for the expanding gas of the cartridge fired by the firearm to which the generator is connected. These safety vents allow the gases to expand if the magnetic actuator were to become lodged in the tube.

A similar pair of opposing openings 57 and 58 are arranged perpendicularly to the axis of openings 55 and 56, as shown in FIGURES 3, 6 and 9.

The disconnect section 31 of the assembly may be formed of any suitable material including conductive materials, and is comprised of a body section 70 having a projecting tubular portion 71 which fits into an undercut portion 73 in tube 40, as best shown in FIGURE 6. This undercut portion 73 also has an external groove 74 therein, whereupon the tube 40 can be secured to mounting section 31 by filling the volume 75 with a suitable epoxy resin.

The body section 70 then has a central opening 76 therein which serves to receive the end of the barrel of the firearm such as the firearm shown in dotted lines in FIGURE 6.

Figure 4:
FIGURE 4 is a side view of a magnetic slug which is contained in the actuator of FIGURE 3.
Figure 5:
FIGURE 5 is an end view of FIGURE 4.

The magnetic actuator body 24 of FIGURES 4 and 5 is then located against a shoulder 77 which extends from opening 76.

The connecting structure 31 can, of course, be constructed in any desired manner to permit its connection to a firearm via the bayonet lock. Where the connection is to be made to a particular type of weapon such as the M-1 rifle, the connecting structure 31 preferably includes an extending member 80 which has a bifurcated end having sections 81 and 82 defined by slot 83. These ends serve to snap over the rifle projection normally used for bayonet attachment.

In the embodiment shown in FIGURES 6 through 10, the novel generator structure is described as a two-piece structure wherein the two pieces are secured together by the epoxy cement 75. It will, however, be apparent to those skilled in the art that this two-piece structure could be formed of a single member, the body of which is shown in cross-section in FIGURE 11. Thus, in FIGURE 11, the body 100 which may be of any suitable nonconductive material may be molded, or formed as a single member having the disconnecting structure 101 secured thereto as an integral part. In all other regards, the body structure of FIGURE 11 will be completed in a manner identical to that described for the embodiment of FIGURES 6 through 10.

In each embodiment, it will be noted that new magnetic actuators such as actuator 24 can be loaded into the device by dropping them into the end of the central opening which is coaxial with the barrel of the firearm. To this end, it has been found useful to cause the central opening extending through coil 42 to converge inwardly by an angle of up to ½ degree in order to centralize the position of the magnet with respect to the muzzle center line.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A portable field generator connectable to the barrel of a firearm; said portable field generator comprising a hollow tubular body of insulation material; a single electrical winding wound around the external surface of said hollow tubular body; an insulation sheath covering said electrical winding; a first and second terminal connection means secured to said hollow tubular body; the ends of said electrical winding being connected to said first and second terminal ends respectively, an internal shoulder formed adjacent one end of said hollow tubular body, a permanent magnet cylinder; said permanent magnet cylinder being positioned adjacent said internal shoulder and being movable through said hollow tubular body to the second end of said body responsive solely to the application of high pressure gas to said first end of said tubular body; and connection means adjacent said first end of said tubular body; said connection means including an extending member connectable to the barrel of said firearm.

2. The device substantially as set forth in claim 1 wherein said internal shoulder communicates with an opening in said one end of said tubular body having a smaller diameter than the diameter of the remaining portion of the opening defining said tubular hollow body; said smaller diameter opening having a diameter substantially equal to the outer diameter of the end of the barrel of said gun, said end of said barrel projecting into said smaller diameter opening when said tubular body is connected to said barrel.

3. The device substantially as set forth in claim 2 wherein said remaining portion of said opening converges inwardly.

References Cited by the Examiner

UNITED STATES PATENTS

| | | | |
|---|---|---|---|
| 2,094,305 | 9/1937 | Savani | 42—1 |
| 2,150,440 | 3/1939 | Hargreaves. | |
| 2,555,384 | 6/1951 | Watt | 89—1 |
| 2,870,675 | 1/1959 | Salisbury | 89—8 X |
| 3,024,374 | 3/1962 | Stauder | 310—14 X |

FOREIGN PATENTS 1,309,350  10/1961  France.

BENJAMIN A. BORCHELT, *Primary Examiner.*

SAMUEL W. ENGLE, *Examiner.*

F. C. MATTERN, JR., *Assistant Examiner.*